(12) United States Patent
Knapp

(10) Patent No.: US 7,063,106 B2
(45) Date of Patent: Jun. 20, 2006

(54) CARTRIDGE FOR A MIXING VALVE AND PROCESS FOR ITS INSTRUMENTAL ASSEMBLY

(75) Inventor: Alfons Knapp, Biberach/Riss (DE)

(73) Assignee: Masco Corporation, Taylor, MI (US)

( * ) Notice: Subject to any disclaimer, the term of this patent is extended or adjusted under 35 U.S.C. 154(b) by 246 days.

(21) Appl. No.: 10/466,988

(22) PCT Filed: May 28, 2002

(86) PCT No.: PCT/EP02/05837

§ 371 (c)(1),
(2), (4) Date: Jul. 23, 2003

(87) PCT Pub. No.: WO03/006863

PCT Pub. Date: Jan. 23, 2003

(65) Prior Publication Data

US 2004/0094213 A1    May 20, 2004

(30) Foreign Application Priority Data

Jul. 10, 2001 (IT) .......................... TO2001A0666

(51) Int. Cl.
*F16K 27/04* (2006.01)
*F16K 11/074* (2006.01)

(52) U.S. Cl. .............................. 137/625.4; 137/625.17; 251/368

(58) Field of Classification Search .......... 137/625.17, 137/625.4; 251/368
See application file for complete search history.

(56) References Cited

U.S. PATENT DOCUMENTS

| | | | | |
|---|---|---|---|---|
| 3,476,149 A | * | 11/1969 | Dornaus ................... | 137/625.4 |
| 3,533,436 A | * | 10/1970 | Parkison .................. | 137/625.4 |
| 3,965,936 A | * | 6/1976 | Lyon ...................... | 137/625.17 |
| 4,088,153 A | * | 5/1978 | Paasikivi ................ | 137/625.17 |
| 4,163,460 A | * | 8/1979 | Zucchetti ................. | 137/625.4 |
| 4,715,406 A | * | 12/1987 | Kress ..................... | 137/625.17 |
| 4,736,772 A | * | 4/1988 | Ostertag et al. ........ | 137/625.17 |
| 4,941,506 A | * | 7/1990 | Bergmann ................ | 137/625.4 |
| 5,372,161 A | * | 12/1994 | Bechte ................... | 137/625.17 |
| 5,518,027 A | * | 5/1996 | Saiki et al. ............. | 137/625.17 |
| 6,019,132 A | * | 2/2000 | Knapp .................... | 137/625.17 |
| 6,209,581 B1 | * | 4/2001 | Gyozo .................... | 137/625.4 |

* cited by examiner

*Primary Examiner*—John Rivell
(74) *Attorney, Agent, or Firm*—Kwadjo Adusei-Poku; Lloyd D. Doigan

(57) ABSTRACT

A mixing valve cartridge assembly having an envelope, a bottom member integral with the envelope, a fixed plate and a movable plate, both made from a hard material, a means for operating the movable plate, and a retaining cover for the cartridge envelope, such that the entire valve cartridge envelope may be assembled by inserting the cartridge components from the top of the envelope.

6 Claims, 3 Drawing Sheets

FIG. 5
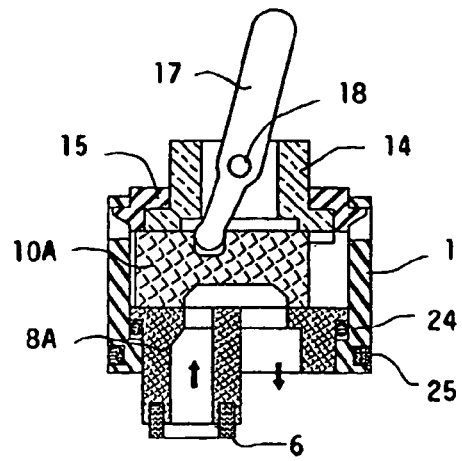
FIG. 6
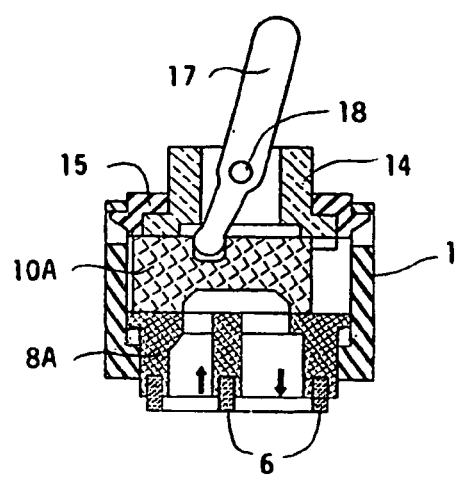
FIG. 7
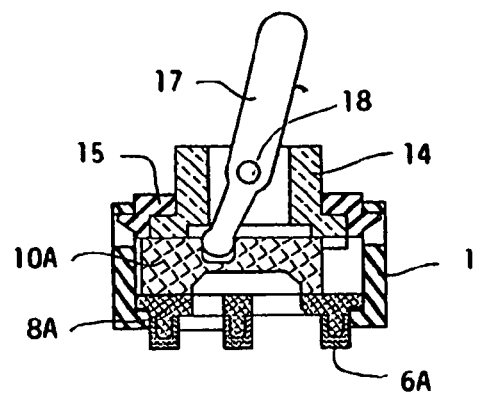
FIG. 8
FIG. 9
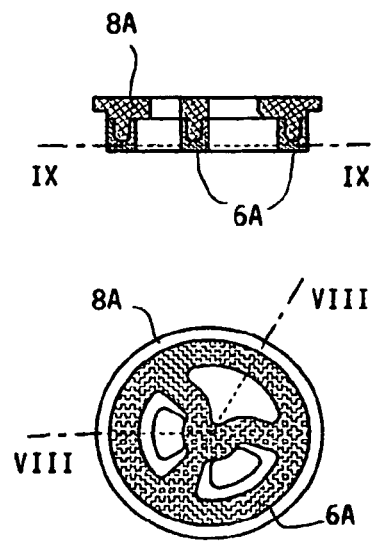

CARTRIDGE FOR A MIXING VALVE AND PROCESS FOR ITS INSTRUMENTAL ASSEMBLY

BACKGROUND OF THE INVENTION

This invention relates to a cartridge including the operating mechanisms for a hydraulic equipment unit, and to a process for its instrumental assembly.

Many hydraulic equipment units are currently built in the form of bodies intended to receive, inserted therein, a cartridge containing all of the operating mechanisms for the apparatus or a great part of them. This manner of proceeding has proved to be suitable for facilitating and economizing the operations involved in control, maintenance, repair, and replacement of mechanisms of the hydraulic apparatus. According to the current state of the art, a cartridge for a hydraulic equipment unit comprises, as flow control members, a pair of plates made of hard material, provided with suitably shaped and cooperating passages, one of which plates is operatively fixed and is supported by a bottom member, while the other one is mobile and is connected to a guide and movement slide which, in turn, is connected to the operating means.

An important problem created by the production of cartridges, which usually entail a relatively large number of component parts, consists in the difficulty of achieving an entirely instrumental assembly of the component parts themselves, which would be desirable in order to reduce the costs and the long period of time needed for a total or partial manual assembly, as well as to ensure a high and uniform quality of the assembly that is done. These difficulties spring from the relatively large number of component parts, from the fact that some of them, such as the packings that are made of yielding material, present difficulties as regards instrumental handling, and by the fact that, considering the current structure of the cartridges, in most cases, the various component parts must be mutually connected by operating, in the case of some of the component parts, along different directions or in opposite senses, which considerably obstructs an instrumental assembly and, for executing the same, creates the need for complex, expensive apparatuses that are easily subjected to breakdown.

SUMMARY OF THE INVENTION

In view of the above, a first object of this invention is to provide a cartridge including the operating mechanisms for a hydraulic equipment unit, whose structure should be particularly suitable for an entirely instrumental assembly. Another object of the invention is to make such a cartridge whose structure should comprise a smaller number of component parts when compared to the structure of the known cartridges. Yet another object of the invention is to make such a cartridge whose structure should, in particular, comprise a reduced number of seal packings made of yielding material. Other purposes of the invention are intended to make it possible to reduce the axial dimensions of the cartridge and/or, in some cases, its radial dimensions. A particular object of the invention is to improve the structure of such a cartridge so that it should be possible to reduce the total amount of tolerances, presented by the assembled cartridge. It is furthermore a purpose of the invention to make such a cartridge which, though meeting with the requirements listed above, should involve, for the implementation of the individual component parts thereof, costs not greater or perhaps even lesser, when compared to the known cartridges.

Finally, a purpose of the invention is to provide a process of practical, easy and economical implementation for the instrumental assembly of a cartridge including the operating mechanisms for a hydraulic equipment unit.

Functionally, the cartridge according to the invention comprises an envelope, a bottom member connected to the envelope, a pair of plates made of hard material, one of which is operatively fixed, while the other one is operatively mobile, a slide for guidance and movement of the mobile plate, a support member for the operating means, along with the operating means themselves, a retaining cover, and the packings necessary for sealing among said component parts and toward the outside, and it is primarily characterized by the fact that the bottom member and the operatively fixed plate constitute a single structural element, forming a plate-bottom unit, though retaining the respective distinct functions.

This feature is made possible by the use of those processes for making hard material plates that make it possible to confer to the plates the relatively complex configurations that are necessary for the operation of the bottom member. Among these processes, may be mentioned, in particular, the process for the injection of sinterizable materials and the process for molding thermosetting materials; but it is understood that other processes can also be used to make such plates of hard material, presenting relatively complex configurations.

Thanks to this feature, the number of component parts of the cartridge can be reduced, both by combining the bottom member and the operatively fixed plate in a single plate-bottom unit, and also, a very important thing, by eliminating the packing that is usually necessary between these component parts.

Thanks to these features, the cartridge can be entirely assembled by means of the introduction, into the envelope, of all of the component parts, in the correct sequence and in a number which, as it has been said, is reduced, always and only operating, for each component part, in the axial direction and preferably in only one sense. This manner of proceeding provides a cartridge assembly process that can be implemented and organized easily and rapidly using relatively simple and safely working automatic apparatuses.

The reduction of the number of component parts generally makes it possible to reduce the axial dimensions of the cartridge. Furthermore, the combination between the bottom member and the fixed plate offers the advantage of preventing an excess of diameter that the bottom member often demands with respect to the diameter of the fixed plate, so that, in these cases, one can also reduce the diameter of the plate-bottom unit and hence the diameter of the entire cartridge.

According to another preferred and very advantageous feature of the invention, the slide and the operatively mobile plate also constitute a single structural element, though preserving their respective distinct functions. This feature likewise is made possible by the use of the above mentioned processes for making plates of hard material, that make it possible to confer to the plates the relatively complex configurations that are necessary for the operation of the slide, which must cooperate with guide means and with operating means.

Thanks to this feature, the number of component parts of the cartridge can be further reduced, both by combining the slide and the operatively mobile plate, and by eliminating the packing that is sometimes necessary between these component parts. However, in certain cases, it may be advisable not to implement the above indicated feature, in view of the advantages obtained when the mobile plate and the slide present different characteristics, in particular, with reference to the friction coefficient and/or the wear resistance.

It should be noted that, in those cases where both the plates made of hard material are integrated with other component parts, by way of the implementation of the invention, the two plates as the case may be, can consist of different materials and/or can be made by means of different processes.

In implementing the invention, it may turn out to be particularly advantageous to use packings with a U-shaped cross section, which packings can be either applied or directly molded upon lower projections of the plate-bottom unit and/or the envelope. Even in the case where these packings are not directly molded upon the pertinent component parts, but rather they are applied to them, the packings do not require an assembly operation performed in the opposite sense with respect to the sense of assembly of the other component parts. Indeed, during the assembly, they can be placed on a support plane or other support member, and the relative component part may be inserted on the packings by operating in the same sense of insertion of the component parts, as provided by the assembly process.

In the particular case, where such packings are applied or molded at the lower end of the envelope of the cartridge, they can perform a double action, toward the plate-bottom unit of the cartridge and toward the body of the hydraulic equipment in which the cartridge will be inserted. It should be noted that, in this case, during assembly, supporting the packing on a support plane or other support member also prevents a tendency toward the expulsion of the packing, during the operation of inserting the plate-bottom unit.

In this particular case, the lower end of the envelope of the cartridge will advantageously have projections or other shapes suitable for preventing the accidental escape of the packing.

BRIEF DESCRIPTION OF THE DRAWINGS

These and other features, objects and advantages of the subject of this invention will appear more clearly from the following description of some embodiments, constituting non restrictive examples, with reference to the enclosed drawings, wherein:

FIGS. 4 to 7 show, similarly to FIG. 2, various embodiments of cartridges according to the invention.

FIGS. 8 and 9 show details of the cartridge according to FIG. 7, in two different sectional views taken, respectively, along line VIII—VIII of FIG. 9 and line IX—IX of FIG. 8.

DESCRIPTION OF THE PREFERRED EMBODIMENTS

The figures show examples of cartridges including operating mechanisms, intended to equip mixing faucets with single control for hot and cold water, which represent an example of the most widespread hydraulic equipment units. It must however be understood that the invention can also be used in making cartridges for any kind of hydraulic equipment, such as, for example, diverters, mixers/diverters, sequential mixers, thermostatic mixers and others.

Figure 1:
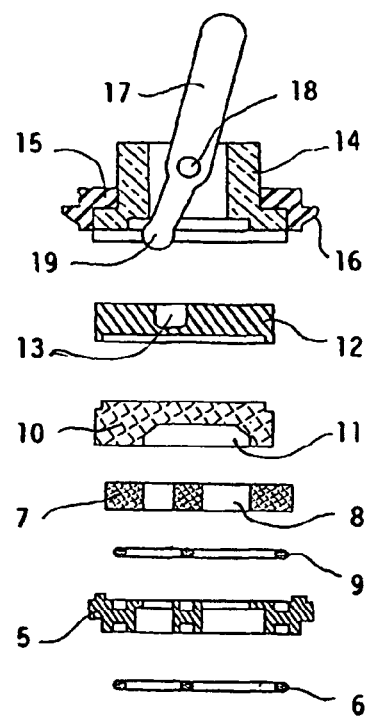
FIG. 1 shows a sectional and exploded view of the various component parts of a cartridge, designed according to the state of the art.
Figure 2:
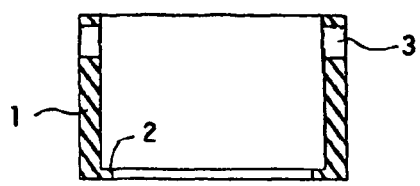
FIG. 2 shows a section of the cartridge resulting from the assembly of the component parts illustrated in FIG. 1.
Figure 3:
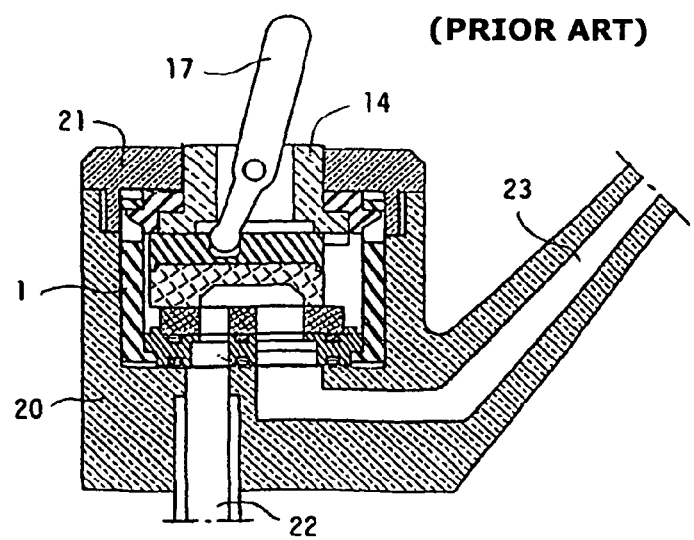
FIG. 3 shows in a sectional view the cartridge shown in FIG. 2, installed in the body of a hydraulic equipment.

With reference to FIGS. 1 to 3, there is shown an example of a cartridge designed according to the state of the art, for purposes of comparison with the cartridges according to the invention.

This known cartridge comprises a tubular envelope 1 that is intended to be closed at one of its ends, namely below, with reference to the Figures and the installation position that is most customarily used for the cartridge, by a bottom member 5 that is equipped with a lower packing 6, to provide a seal against the bottom of the cavity of a faucet body 20 into which the cartridge will be inserted, and with an upper packing 9, to provide a seal with respect to the operatively fixed plate made of hard material 7, provided, as is customary, with passages 8, through with a flow is to run. Envelope 1 of the cartridge has an internal lower shoulder 2 and is so shaped as to receive, from above, the rest of the bottom member 5, which is correspondingly shaped.

Upon the operatively fixed plate 7 there is supported, in a smoothly sliding manner, a mobile plate made of hard material 10, which is also provided with passages 11 for the flow. In this case, passages 11 do not traverse the plate, as on the contrary they can do in other embodiments. Connected to mobile plate 10 is a guide and moving slide 12 that is provided with a cavity 13 for connection with operating means. Slide 12 is retained and guided by a rotatable support member 14 upon which is hinged, at 18, an operating lever 17, whose lower end 19 is intended to be connected to cavity 13 of slide 12. A cover 15 retains all the component parts described inside envelope 1, being connected to the latter by means of teeth 16 that are inserted by elastic snap in openings 3 of envelope 1.

The component parts described here are generally well known to those skilled in the art, as is the operation of such a cartridge, that makes it possible to adjust the mixing ratio between two flows of water, respectively hot and cold water, and to regulate the delivery rate of mixed water that is drawn. The cartridge is inserted in a faucet body 20 and is retained by a cover 21; body 20 is reached by two flows of hot and cold water through pipes 22 (only one of which is visible in FIG. 3), and the mixed water is drawn, in this example, through a delivery spout 23, while in other cases it is delivered through a pipe.

It is noted that the component parts of this cartridge are relatively numerous and, in particular, they comprise various packings made of yielding material; their assembly is delicate and, at least in the case of some of them, it must be performed by proceeding in a sense opposite to the sense of general assembly of the component parts.

The invention seeks to reduce the number of component parts of the cartridge and, especially, the number of packings made of yielding material, and these improvements make it possible to achieve major advantages both in the structure of the cartridge and in the process for its assembly, as well as in its use. In particular, the reduction in the number of component parts and packings leads to a corresponding and significant reduction in the tolerances with respect to the axial dimension of the assembled cartridge, which adds up to the sum of the tolerances of the individual component parts. Proceeding according to the state of the art, the total tolerance presented by a cartridge often turns out to be such as to make it impossible to assemble the cartridge in the body of the hydraulic equipment unit by completely screwing a cover of the body, so that one must proceed to a partial screwing action, that depends on the sensitivity of an operator or that is ensured by a dynamometric wrench. These drawbacks are eliminated by the implementation of the invention.

Figure 4:
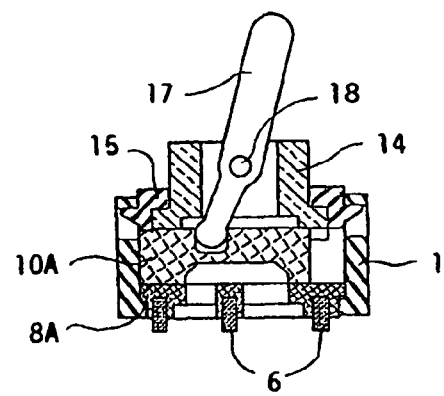

As shown in FIG. 4, by using the mentioned processes for the shaping of hard plates which make it possible to confer to the plates relatively complex shapes, it is possible to provide an operatively fixed plate 8A which combines, within itself, both the function of a flow control member of a standard fixed plate 8, and the function of completing the envelope 1 of a standard bottom member 5, thus constituting a plate-bottom unit and rendering superfluous the packing 9 that is normally placed between a bottom member and a fixed plate. This means that the number of component parts of the cartridge is reduced by two units, with the particular advantage of having eliminated a packing made of yielding material, which is much less easy to handle, while the only remaining packing 6 can advantageously be shaped so as to facilitate its assembly and to prevent its expulsion in case of overpressures.

From the feature now described, it follows that all of the component parts of the cartridge, including the plate-bottom unit 8A, can be installed in envelope 1 by shifting them in the correct sequence along the axis of envelope 1, all in the same direction which runs toward shoulder. This unidirectional assembly, made on a reduced number of component parts, permits the development of an assembly process that can be done instrumentally in the simplest and best organizable manner. This makes it possible to assemble the cartridge in an entirely instrumentally fashion, thus avoiding any use of manpower, and employing equipment with the minimum possible structural and functional complexity.

On the other hand, as shown in the same FIG. 4, by using the above mentioned processes for making hard plates which make it possible to confer to the plates relatively complex shapes, it is possible to make a mobile plate 10A which, in itself, combines both the flow control member function of a standard mobile plate 10, and the guide and moving function of a standard slide 12. In that way, the number of component parts of the cartridge can be reduced by yet another unit.

By adopting both of these measures, as shown in FIG. 4, the number of component parts of the cartridge is reduced by three units, to the advantage of the implementation of the assembly process and, furthermore, a rather appreciable reduction of the dimension of the cartridge in the axial direction is achieved.

Furthermore, as according to the state of the art it happens in many cases that the bottom member must present an excess of diameter with respect to the operatively fixed plate, the combination of both these members by constituting a plate-bottom unit eliminates the need for the above mentioned excess of diameter, and, by avoiding it, it is also possible, in certain cases, to reduce the diameter of the plate-bottom unit and of the entire cartridge, as shown in FIG. 4.

The mentioned measures aimed at the reduction of the number of component parts can also be adopted when to the fixed plate 8A, also working as bottom member special configurations must be given, which are made necessary by the type of hydraulic equipment for which the cartridge is intended, as in the case shown in FIGS. 5 and 6, although, in some of these cases (such as, for example, the case of FIG. 5), the very nature of the apparatus makes it necessary to add peripheral packings 24 and 25.

On the other hand, as shown in FIG. 6, in cases where the output of the mixed water takes place through a pipe that starts from the bottom of the body of the mixer in which the cartridge is inserted, the number of packings with which the cartridge is equipped is reduced to just a single one.

FIG. 7 shows a modification of the cartridge according to FIG. 4, wherein a lower packing 6A has been adopted, which has a U-shaped cross-section and is placed on a corresponding lower projection presented by the fixed plate 8A also acting as bottom member. This packing can be shaped in a complex manner, as shown particularly in FIG. 9, so as to serve by itself for all of the passages for fluids provided for in the fixed plate 8A also operating as bottom member. Such a packing can be molded directly upon the corresponding projections of the fixed plate 8A also working as bottom member, or it can be simply inserted on the projections themselves. Also this operation can be performed within the scope of the assembly process according to the invention, by having the expedient of installing packing 6A on a support plane or other support member and then lowering on it, during the operation of assembling the cartridge, the fixed plate 8A that also works as bottom member.

As mentioned earlier and as shown in FIG. 10, the provision for constituting a single member 8A, forming the fixed plate and the bottom member of the cartridge, may not be accompanied by the similar provision of combining the mobile plate 10 with slide 12. This can be suitable in certain cases, for example in order to employ, for slide 12, a material with a reduced friction coefficient or with a particular wear resistance.

Figure 10:
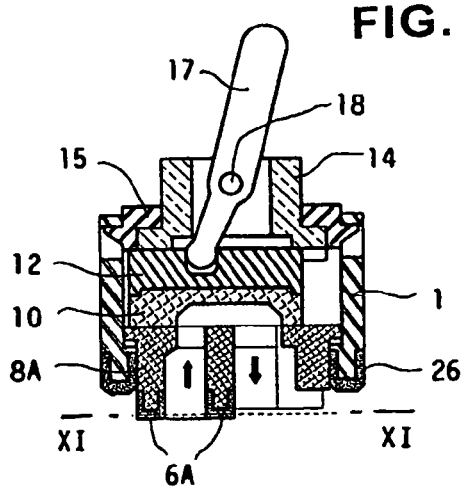
FIG. 10 shows, similarly to FIG. 2, another embodiment of a cartridge according to the invention.
Figure 11:
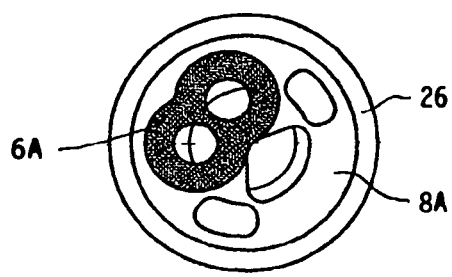
FIG. 11 shows a sectional view of the cartridge, taken along line XI—XI of the FIG. 10.
Figure 14:
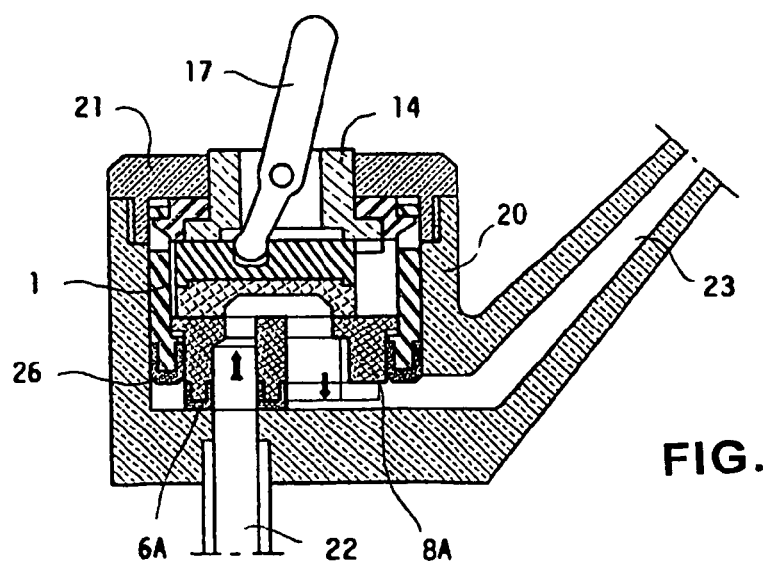
FIG. 14 shows the cartridge according to FIG. 10, installed in the body of a hydraulic equipment unit.

FIG. 10 also shows how a packing 26 having a U-shaped cross section can advantageously applied upon the lower end of envelope 1, below shoulder 2, in those cases where it is necessary for envelope 1 of the cartridge to seal with respect to body 20 of the hydraulic equipment unit in which the cartridge will be inserted. This packing 26 then has a double action, toward the interior, with respect to the fixed plate 8A also acting as bottom member, and toward the outside, with respect to body 20 of the hydraulic equipment unit, as shown in FIG. 14.

Figure 12:
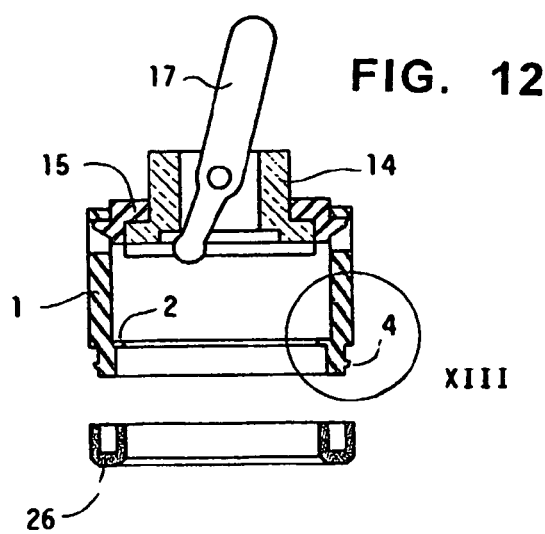
FIG. 12 shows a detail of the assembly of a U-shaped packing upon the envelope of the cartridge according to FIG. 10.
Figure 13:
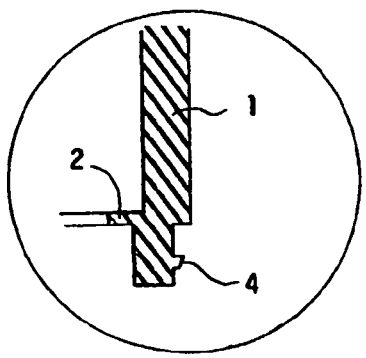
FIG. 13 shows on a larger scale the detail designated by XIII in FIG. 12.

In order to ensure the solidity of packing 26 at the lower end of envelope 1, this latter can advantageously have a peripheral projection 4, as shown in FIGS. 12 and 13, or other anchoring means.

It must be understood that the invention is not confined to the embodiments described and illustrated as examples. Several modifications can be made by those skilled in the art, especially in order to adapt the features of the cartridge to the nature and configuration of the hydraulic equipment unit for which it is intended. For example, in certain cases, the plate-bottom unit 8A could be installed in envelope 1 not by introducing the same in the envelope in the direction that moves toward a shoulder 2 of the envelope, but by inserting around it the envelope 1, which in this case should be equipped with means for coupling to the plate-bottom 8A, different from a shoulder. As was mentioned earlier, the materials constituting the two plates made of hard material can be chosen in various ways and/or can be made by means of different processes. Furthermore, the connection of the plate-bottom unit to the envelop of the cartridge was described and illustrated as being performed by means of complementary shoulders, but this connection can also be done in a different way; for example, envelope 1 can have teeth or some other elastically deformable members, suitable for retaining the plate-bottom unit 8A by means of elastic snaps. In this case, the component parts can be assembled in the envelope, always in the axial direction, but in a direction opposite to the described direction, that is to say, from the bottom to the top, with reference to the drawings. In this case the cover 15 of the cartridge can also be made solid with envelope 1.

These modifications and any substitution with technically equivalent means can be introduced in what has been described and illustrated, without departing from the spirit of the invention and the scope of this Patent, as defined by the Claims.

The invention claimed is:

1. A cartridge including the operating mechanisms for a hydraulic equipment unit, functionally comprising an envelope,
   a bottom member connected to the envelope,
   a first operatively fixed plate made of a hard material and a second operatively movable plate, also made of a hard material, the plates being manufactured via the process of injection molding thermosetting materials such that the plates may be configured into complex shapes,
   a slide for guide and movement of the mobile plate,
   operating means,
   a support member for the operating means,
   a retaining cover and
   a plurality of packings necessary for sealing among said component parts and toward the outside, wherein at least one packing having a U-shaped cross section, is directly molded upon the projections presented by the first operatively fixed plate such that said packing also acts as the bottom member,
   characterized in that
   (a) the bottom member and the operatively fixed plate constitute a single structural element, forming a plate-bottom unit, which is produced by means of one of the processes for making plates of hard material that make it possible to confer to the plates relatively complex configurations;
   (b) the cartridge envelope has, close to its bottom end, an internal shoulder suitable for retaining the plate-bottom unit; and
   (c) the plate-bottom unit itself and all of the other component parts of the cartridge are so shaped as to be housed and mutually engaged in the cartridge envelope due to the effect of their introduction into the envelope according to the axial direction of the envelope and in the only direction that extends toward said bottom internal shoulder.

2. Cartridge according to claim 1, characterized in that the operatively mobile plate and the guide and movement slide therefor also constitute a single structural element, which is produced by means of one of the processes for making plates of hard material that make it possible to confer to the plates relatively complex configurations.

3. Cartridge according to claim 1, characterized in that the fixed plate and the mobile plate consist of different materials.

4. Cartridge according to claim 1, characterized in that the fixed plate and the mobile plate are made by means of different production processes.

5. Cartridge according to claim 1, characterized in that said packing having U-shaped cross-section is inserted on projections of the member that it must seal, said projections having configurations suitable for preventing the accidental escape of the packing or its expulsion during the operation of assembly of other component parts.

6. Cartridge according to claim 5, characterized in that said packing having U-shaped cross-section is provided on an end of the envelope of the cartridge and performs a double action, toward the bottom member of the cartridge and toward the body of the hydraulic equipment in which the cartridge will be inserted.

* * * * *